United States Patent [19]

Nann et al.

[11] 4,310,353
[45] Jan. 12, 1982

[54] LOW-ANTIMONY LEAD ALLOY

[75] Inventors: Eberhard Nann, Soest-Deiringsen; Ulrich Heubner, Bad Homburg, both of Fed. Rep. of Germany

[73] Assignee: Metallgesellschaft AG, Frankfurt am Main, Fed. Rep. of Germany

[21] Appl. No.: 124,503

[22] Filed: Feb. 25, 1980

[30] Foreign Application Priority Data

Feb. 23, 1979 [DE] Fed. Rep. of Germany ....... 2907227

[51] Int. Cl.$^3$ ........................ C22F 11/10; C22C 11/08
[52] U.S. Cl. .................................. 75/166 B; 75/166 C
[58] Field of Search ........................ 75/166 B, 166 C

[56] References Cited

U.S. PATENT DOCUMENTS

| 1,865,727 | 7/1932 | Schuricht et al. | 75/166 B |
| 1,896,743 | 2/1933 | Townsend | 75/166 C |
| 2,446,996 | 8/1948 | Bouton et al. | 117/131 |
| 2,694,628 | 11/1954 | Carroll et al. | 75/166 |
| 3,113,020 | 12/1963 | Larsen | 75/135 |
| 3,801,310 | 4/1974 | Nijhawan | 75/166 C |
| 3,879,217 | 4/1975 | Peters | 135/26 |
| 3,990,893 | 11/1976 | Nijhawan et al. | 75/166 C |
| 3,993,480 | 11/1976 | Ueberschauer et al. | 75/166 C |
| 4,158,563 | 6/1979 | Hebbar et al. | 75/166 C |

FOREIGN PATENT DOCUMENTS 2337708  6/1975  Fed. Rep. of Germany .... 75/166 B

*Primary Examiner*—Upendra Roy
*Attorney, Agent, or Firm*—Sprung, Felfe, Horn, Lynch & Kramer

[57] ABSTRACT

A low-antimony lead alloy for use in the manufacture of paste-holding grids for lead-acid storage batteries contains 0.05 up to but less than 1.5 percent antimony. Such alloys represent an optimum combination of good processability, freedom from need for maintenance, low self-discharge rate and high cycle strength.

22 Claims, No Drawings

LOW-ANTIMONY LEAD ALLOY

BACKGROUND OF THE INVENTION

1. Field of the Invention

This invention relates to a low-antimony lead alloy for use in the manufacture of paste-holding grids for lead-acid storage batteries.

2. Discussion of the Prior Art

The grids of lead-acid storage batteries are usually made from a Pb-Sb alloy which contains 4 to 11 percent antimony. Because pure lead is inherently soft and cannot be used to make storage battery grids, antimony is added to ensure that the material used to make storage battery grids has the required strength and castability. But the antimony added to these alloy is expensive and appreciably adds to the cost of making the grids. Additionally, the self-discharge rate of the storage battery increases with the antimony content. Moreover, a higher antimony content results in an increase evolution of gas and the storage battery in operation results in a poisoning of said electrode.

For these reasons it has been endeavored to decrease the antimony content of the grids for leading acid accumulators as far as possible.

Hypoeutectic lead-antimony alloys have been used, which contains 1.5 to 3.5 percent antimony as well as 0.025 to 0.2 percent arsenic, 0.005 to 0.1 percent selenium and 0.01 to 0.05 percent tin (German Pat. No. 2,151,733). The grids made from such lead-antimony alloy and used in starter batteries require no maintenance, i.e., no topping up, during their lifetime. Besides, such grids have a useful cycle strength, which means that the changing and discharging cycles of the battery do not result between the grid and the positive paste in a formation of insulating cover layers by which a discharge of the plate would be rendered more difficult and may even be inhibited. It is known from German Pat. No. 2,439,729 that the cycle strength of the above-mentioned low-antimony lead alloys can be further improved by an addition of tin in an amount of, e.g., 0.05 to 0.5 percent. On the other hand, storage battery grids made from such tin-containing low-antimony lead alloys exhibit a relatively high self-discharge rate so that the storage battery must be re-charged when it has been out of operation for considerable time. This is particularly significant with new motor vehicles, which have been for sale for a relatively long time or are shipped over long distances.

It is an object of the present invention to provide a lead alloy which is intended for use in storage batteries and in which the requirements regarding freedom from need for maintenance, low self-discharge rate, high cycle strength and ease of processing are optimally combined.

This object is accomplished by the provision of a low-antimony lead alloy which contains 0.05 to 1.5 percent, preferably 0.4 to 0.5 percent antimony, balance lead and impurities which are due to the manufacture. Preferably, the antimony content is less than 1.5 percent.

If the lead alloy according to the invention additionally contains 0.005 to 0.1 percent selenium for grain refinement, the alloy can directly be cast to form grids without hot tearing or can be rolled into strip, which can be expanded to form grids.

The strength and hardness of the grid can be improved by an addition of 0.02 to 0.5 percent arsenic, if desired. The arsenic content is preferably 0.08 to 0.15 percent with cast grids and 0.04 to 0.06 percent with wrought grids or expanded metal grids.

In accordance with an additional preferred feature of the invention, selenium can be replaced by 0.002 to 0.012 percent preferably 0.002 to 0.006 percent sulfur. This results in a lower cost and in a lower toxicity than where selenium is used because the maximum allowable concentration of selenium at the work-place is only 1/10 that of sulfur. In addition, the quantity of sulfur required for the desired effect is lower for sulfur than for selenium. This is of high significance for the manufacture and processing as well as for the reprocessing of storage battery scrap. As to castability, sulfur in the presence of 0.01 to 0.1 percent, preferably 0.015 to 0.06 percent copper acts like selenium and is a fully satisfactory substitute for copper in this respect. Another advantage afforded by the use of copper is the fact that it opposes the drossing of the molten metal to be cast. It will also be advantageous to include 0.010 to 0.1 percent, preferably 0.03 to 0.06 percent silver in the alloy according to the invention.

Any difficulty which may arise regarding the castability of the lead alloy according to the invention can be eliminated by an addition of 0.002 to 0.5 percent tin.

As a result of the manufacture, the lead alloy contains up to 300 grams bismuth per metric ton; this addition increases the strength.

EXAMPLE

A lead alloy composed of

| Antimony | 0.5 | to | 0.7 | percent by weight |
|---|---|---|---|---|
| Arsenic | 0.09 | to | 0.12 | percent by weight |
| Copper | 400 | to | 500 | grams per metric ton |
| Sulfur | 40 | to | 60 | grams per metric ton |
| Bismuth | 200 | to | 250 | grams per metric ton |
| Tin | 80 | to | 100 | grams per metric ton | was cast to form starter battery grids. The batteries made with these grids exhibited good starting properties and an excellent resistance to corrosion in case of cyclic loads and overloads.

The advantages afforded by the low-antimony lead alloys according to the invention for use in storage batteries reside in that they permit the construction of storage batteries which are unique in that they have extremely low self-discharge rates and a high cycle strength and require no maintenance. Additionally, the processing difficulties which occur with alloys consisting of lead and alkaline earth metals, particularly the melting loss, are avoided in principle.

What is claimed is:

1. An antimony-lead alloy consisting essentially of:
    antimony in an amount of 0.05 up to less than 1.5 weight percent,
    arsenic in an amount of 0.02 to 0.5 percent by weight,
    selenium in an amount of 0.005 to 0.1 percent by weight,
    tin in an amount of 0.002 to 0.5 percent by weight,
    bismuth, said bismuth being present in an amount up to 300 grams per metric ton, the balance being lead with the usual impurities due to manufacture.

2. A lead alloy according to claim 1 containing 0.4 to 0.5 weight percent antimony.

3. A lead alloy according to claim 1 additionally containing 0.02 to 0.5 weight percent arsenic.

4. A lead alloy according to claim 1 containing additionally 0.002 to 0.012 weight sulphur.

5. A lead alloy according to claim 1 additionally containing 0.01 to 0.1 weight percent copper.

6. A lead alloy according to claim 1 additionally containing 0.010 to 0.1 percent by weight silver.

7. A battery grid made of the lead alloy of claim 1.

8. An antimony-lead alloy according to claim 1 containing at least 200 grams per metric ton bismuth.

9. A lead alloy according to claim 3 wherein the arsenic content is 0.05 to 0.15 weight percent.

10. A lead alloy according to claim 3 wherein arsenic content is 0.04 to 0.06 weight percent.

11. A battery grid of made of an alloy according to claim 3.

12. A lead alloy according to claim 4 wherein the sulphur is 0.002 to 0.006 weight percent.

13. A battery grid made of an alloy according to claim 4.

14. A lead alloy according to claim 5 wherein the copper content is 0.015 to 0.06 weight percent copper.

15. A battery grid made of an alloy according to claim 5.

16. A lead alloy according to claim 6 wherein the silver content is 0.03 to 0.06 weight percent.

17. A battery grid made of an alloy according to claim 6.

18. An antimony-lead alloy according to claim 8 wherein bismuth is present in an amount of 200 to 250 grams per metric ton.

19. A battery grid made of the lead alloy of claim 8.

20. A battery grid made of an alloy according to claim 10.

21. A battery grid made of the lead alloy of claim 18.

22. A lead alloy consisting essentially of
antimony 0.5 to 0.7 percent by weight,
arsenic 0.09 to 0.12 percent by weight,
copper 0.04 to 0.05 percent by weight,
sulfur 0.004 to 0.006 percent by weight,
bismuth 0.02 to 0.025 percent by weight,
tin 0.008 to 0.01 percent by weight,
the balance being lead with the usual impurities due to manufacture.

* * * * *